(12) United States Patent
Scherzer et al.

(10) Patent No.: US 6,329,440 B2
(45) Date of Patent: Dec. 11, 2001

(54) PREPARATION OF POLYISOCYANATE POLYADDITION PRODUCTS

(75) Inventors: Dietrich Scherzer, Neustadt; Ulrich Treuling, Bensheim; Martin Kreyenschmidt, Worms; Anton Kappes, Olching; Klaus Pittrich, Herrsching, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/305,946

(22) Filed: May 6, 1999

(30) Foreign Application Priority Data

May 9, 1998 (DE) .............................................. 198 20 917
Nov. 10, 1998 (DE) .............................................. 198 51 880

(51) Int. Cl.[7] ................................................... C08L 75/00
(52) U.S. Cl. ......................................... 521/137; 525/131
(58) Field of Search ............................. 521/137; 525/131

(56) References Cited

U.S. PATENT DOCUMENTS

| | | | |
|---|---|---|---|
| 3,432,451 | * | 3/1969 | Kales . |
| 3,808,129 | | 4/1974 | Lindlof et al. . |
| 3,935,132 | * | 1/1976 | Gerkin et al. . |
| 4,127,515 | * | 11/1978 | MacRae et al. ..................... 521/112 |
| 4,439,548 | * | 3/1984 | Weisman ............................. 521/130 |
| 4,525,386 | * | 6/1985 | Weisman ............................. 427/185 |
| 5,350,777 | * | 9/1994 | Yuge et al. .......................... 521/117 |
| 5,936,018 | | 8/1999 | Müller et al. ........................ 524/318 |

FOREIGN PATENT DOCUMENTS

| | | |
|---|---|---|
| 379149 | 7/1990 | (EP) . |
| 0655488 | 5/1995 | (EP) . |
| 0845492 | 6/1998 | (EP) . |
| 2171150 | 9/1973 | (FR) . |
| 50052194 * | 5/1975 | (JP) . |
| WO92/22595 | 12/1992 | (WO) . |

OTHER PUBLICATIONS

EPO Search Report dated Aug. 9, 1999; Translation of EPO Search Report.
SP–002110749; Derwent Chem Abstract of JP930343099., 1995.

* cited by examiner

*Primary Examiner*—Ana Woodward
(74) *Attorney, Agent, or Firm*—Fernando A. Borrego; Mary K. Cameron

(57) ABSTRACT

In a process for preparing polyisocyanate polyaddition products by reacting isocyanates with compounds which are reactive toward isocyanates, in the presence or absence of blowing agents, catalysts, auxiliaries and/or additives, the reaction is carried out in the presence of (i) particles which have a size of <200 μm and a melting point in a range from 50 to 300° C., or in the presence of thermoset particles (ii) or in the presence of particles (i) and (ii).

9 Claims, No Drawings

PREPARATION OF POLYISOCYANATE POLYADDITION PRODUCTS

The present invention relates to a process for preparing polyisocyanate polyaddition products by reacting isocyanates with compounds which are reactive toward isocyanates, in the presence or absence of blowing agents, catalysts, auxiliaries and/or additives, and also to polyisocyanate polyaddition products which can be prepared by this process. The invention further relates to the use of thermoplastic particles which have a size of <200 μm and a melting point in the range from 50 to 300° C. for producing usually foamed polyisocyanate polyaddition products which have greatly reduced the dust formation during sawing.

Furthermore, the invention relates to a process for preparing a low-wear polyisocyanate polyaddition product, in particular a foamed or compact elastomer of this type, by reacting isocyanate components with components comprising compounds which are reactive toward isocyanates in the presence or absence of blowing agents, catalysts, auxiliaries and/or additives and to polyisocyanate polyaddition products which can be prepared by this process. The invention also relates to low-wear compositions, storage-stable components, a process for setting particular properties in polyisocyanate polyaddition products or compositions and to the use of polyisocyanate polyaddition products or compositions for improving the wear behavior and to articles which comprise at least one of the abovementioned materials.

The preparation of polyisocyanate polyaddition products, usually polyurethane and possibly polyisocyanurate products, for example polyurethane foams and compact or foamed elastomers, by reacting an isocyanate component B with a component A comprising compounds which are reactive toward isocyanates, in the presence or absence of blowing agents, catalysts, auxiliaries and/or additives, has been described many times.

In further processing of, for example, polyurethane foams, in particular rigid polyurethane foams which may contain polyisocyanurate structures, sawing the moldings or cutting them by means of a hot wire results in undesirable dust formation and a rough surface.

It is an object of the present invention to develop a process for preparing polyisocyanate polyaddition products by reacting isocyanates with compounds which are reactive toward isocyanates, in the presence or absence of blowing agents, catalysts, auxiliaries and/or additives, which makes it possible to obtain polyisocyanate polyaddition products which have greatly reduced dust formation during further processing involving local action of heat, for example sawing with generation of frictional heat or, in particular, cutting by means of a hot wire, and subsequently have a pleasantly smooth surface.

We have found that this object is achieved by carrying out the reaction of isocyanates with isocyanate-reactive compounds, in the presence or absence of blowing agents, catalysts, auxiliaries and/or additives, in the presence of particles (i) which have a size of <200 μm preferably <100 μm, particularly preferably from 2 to 100 μm, in particular from 10 to 100 μm, and have a melting point in a range from 50 to 300° C., preferably from 70 to 200° C., or in the presence of particles (ii), which are thermoset, or in the presence of particles (i) and (ii). The particle size of particles (ii) is in the same range as the particle size of particles (i). As particles (i), use is made of generally known compounds or mixtures which have the melting point specified according to the invention and can be brought to the size specified according to the present invention by customary methods, for example by known milling methods or spray drying, or are commercially available in this size. Examples of particles (i) which can be used are polyolefins, polyolefin copolymers and/or waxes, for example polyethylene, polypropylene, polyolefins comprising polyethylene and polypropylene units, which have been copolymerized with maleic acid and/or vinyl acetate, for example EVA, polystyrenes, modified polystyrenes and/or modified polyolefins, Fischer-Tropsch waxes (synthetic paraffin), montan waxes, carnauba wax, candilla wax, vegetable and/or animal waxes, e.g. esters of fatty acids having from 20 to 53 carbon atoms which are esterified with organic alcohols having from 1 to 5 hydroxyl groups, for example glycerol.

Preference is given to using polyolefins which may be modified or unmodified and/or waxes.

Appropriate waxes are commercially available, for example micronized polyethylene wax (AF-31 wax) from BASF Aktiengesellschaft.

For the purposes of the present invention, the size of the particles (i) is the diameter which the particles (i) would have if they were present as spheres having the corresponding volume.

A further problem which frequently gives rise to complaints in the case of articles, particularly foams, films, fibers, moldings and coatings, in particular shoe soles, which comprise at least some polyisocyanate polyaddition products, in particular polyurethanes, is excessively high wear.

This wear has previously been reduced in the case of shoe soles by adding silicone rubber to the polyisocyanate polyaddition products or polyurethanes.

However, the use of silicone rubber has drawbacks, since it can be mixed only in very small amounts and with great technical difficulty with compounds (component A) which are reactive toward isocyanates. This poor miscibility leads, for example, to the silicone rubber and the component A very quickly undergoing phase separation. This leads, for example, to the problem that the mixture of component A and silicone rubber cannot be stored for a prolonged period or cannot be transported over long distances. In general, the occurrence of phase separation makes it necessary for the component A comprising silicone rubber to be stirred again immediately before preparation of the polyisocyanate polyaddition adduct to achieve sufficient mixing of the silicone rubber with the component A.

Furthermore, the addition of silicone rubbers leads only to an apparent improvement in the wear behavior. The materials modified with a silicone rubber produce a wax-like layer on the surface of the article rubbing along the surface of the silicone-modified material. This layer allows better sliding. Thus, for example, the surface of emery paper becomes covered with wax when the material modified with a silicone rubber is rubbed across the emery paper. The wax-layer formed on the emery paper robs the surface of the emery paper of its roughness and thus allows the surface of the emery paper and the surface of the material modified with silicone rubber to slide over one another more readily. In addition, the silicone rubbers are comparatively expensive materials.

A further object of the present invention is to overcome the abovementioned disadvantages associated with the silicone rubber and, in particular, to provide a low-wear polyisocyanate polyaddition product or a low-wear composition and a storage-stable component, particularly one which has less tendency toward phase separation.

Furthermore, it is preferred according to the present invention for the polyaddition product to have a wear of less than 250 mg in accordance with DIN 53516. For this purpose, the polyaddition product preferably contains thermoset particles (ii), either alone or in combination with particles (i). These polyaddition products will hereinafter be referred to as "low-wear" polyisocyanate polyaddition products.

For the purposes of the present invention, thermoset means that materials having these properties are not fusible. Thermoset particles can, according to the present invention, be either polymers or inorganic materials. In the case of polymers, it is preferred that they be crosslinked. Particularly preferred polymers are polycondensates, for example bakelites, polyamides, polyimides and the like. Inorganic thermosets are preferably mineral materials. Among these, particular preference is given to the fillers described further below in the present application.

The thermoset particles (ii) preferably have the same size as the fusible particles (i), said size being identically defined.

However, it is preferred according to the present invention for the particles (i) to have a melting point and, in particular, be wax-like.

Furthermore, we have found that the abovementioned objects are achieved by a low-wear composition comprising at least one polyisocyanate polyaddition product according to the present invention or at least one foamed or compact elastomer according to the present invention or at least two thereof.

In addition, the objects of the invention are achieved by a storage-stable component A comprising compounds which are reactive toward isocyanates and at least one type of particles (i) and/or (ii). In another embodiment of the present invention, the particles (i) and/or (ii,) can also be present in the component B, as a result of which this component likewise gains a greater storage stability compared to components admixed with silicone rubbers. Thus, the particles (i) and/or (ii) enable the storage stability of the components used to be increased.

The low-wear compositions of the present invention comprise at least one polyisocyanate addition product or at least one foam or compact elastomer or at least two thereof as constituents in an amount in the range from 0.1 to 100% by weight, preferably from 1 to 30% by weight and particularly preferably from 1.1 to 8% by weight, based on the low-wear composition.

According to the present invention it is preferred that the weight ratio of the compounds which are reactive towards isocyanates to the particles (i) and/or (ii) is from 5:1 to 300:1, preferably from 5:1 to 200:1, particularly preferably from 5:1 to 100:1 and even more preferably from 5:1 to 20:1.

Apart from the abovementioned constituents, the low-wear composition may comprise, as further constituents, all polymers, additives and auxiliaries known to those skilled in the art.

According to the present invention, it is preferred that the polyisocyanate polyaddition products, in particular the compact or foamed elastomers, and the low-wear composition obtainable by means of the process of the present invention have at least one of the following properties: Shore A hardness in the range from 10 to 90, preferably from 30 to 80 and particularly preferably from 40 to 70, or Shore D 30 hardness in the range from 10 to 60, preferably from 20 to 50 and particularly preferably from 30 to 40; long-term flexural strength in the range from I to 8, preferably from 2 to 7; wear in accordance with DIN 53516 of less than 250 mg, preferably less than 150 mg and particularly preferably less than 100 mg. It is particularly preferred that the compact or foamed elastomers or the low-wear compositions have Shore hardnesses and wear values in the abovementioned ranges. Further preference is given to compact or foamed elastomers and low-wear compositions which have Shore hardnesses, long-term flexural strengths and wear values within the abovementioned ranges.

According to the present invention, it is particularly preferred that the compact elastomers have, either alone or in combination with the other properties, a Shore D hardness in the abovementioned ranges. The Shore D hardness is determined in accordance with DIN 53505.

In a further embodiment of the present invention, preference is given to low-wear polyisocyanate polyaddition products which contain from 0.1 to 10% by weight, preferably from 0.5 to 9% by weight and in particular from 1 to 5% by weight, in each case based on the polyisocyanate polyaddition product, of at least one type of particles (i) and/or (ii).

The storage life of the component comprising at least one type of particles (i) and/or (ii) is at least 3 days, preferably at least 5 days and particularly preferably at least 14 days.

To further reduce the tendency toward phase separation, emulsifiers or auxiliaries as are described in EP A 0 368 217 are preferably added.

Storage stability of the component is ensured when there is no occurrence of phase separation of the remaining components and the particles (i) and/or (ii) which results in inhomogeneous distribution of the particles (i) and/or (ii) in the component.

The further starting materials for the process of the present invention are described below by way of example:

Suitable isocyanates are the aliphatic, cycloaliphatic, araliphatic and/or aromatic isocyanates known per se, preferably diisocyanates, which may have been, if desired, biuretized and/or isocyanuratized by generally known methods. Specific examples are: alkylene diisocyanate having from 4 to 12 carbon atoms in the alkylene radical, for example dodecane 1,12-diisocyanate, 2-ethyltetramethylene 1,4-diisocyanate, 2-methylpentamethylene 1,5-diisocyanate, tetramethylene 1,4-diisocyanate, lysine ester diisocyanates (LDI), hexamethylene 1,6-diisocyanate (HDI), cyclohexane 1,3- and/or 1,4-diisocyanate, hexahydrotolylene 2,4-and 2,6-diisocyanate and also the corresponding isomer mixtures, dicyclohexylmethane 4,4'-, 2,2'-and 2,4'-cliisocyanate and also the corresponding isomer mixtures and 1-isocyanato-3,3,5-trimethyl-5-isocyanatomethylcyclohexane (IPDI), and also tolylene 2,4-and/or 2,6-diisocyanate, diphenylmethane 4,4'-, 2,4'-and/or 2,2'-diisocyanate, polyphenylpoly-methylene polyisocyanates and/or mixtures comprising at least two of the abovementioned isocyanates. Furthermore, diisocyanates and/or polyisocyanates containing ester, urea, allophanate, carbodiimide, uretdione and/or urethane groups can be used in the process of the present invention.

As compounds which are reactive toward isocyanates, use can advantageously be made of those having a functionality of from 2 to 8, preferably from 2 to 6, and a molecular weight of from 60 to 10,000 and having hydroxyl, thiol and/or primary and/or secondary amino groups as groups which are reactive toward isocyanates. Compounds which have been found to be useful are, for example, polyols selected from the group consisting of polyether polyols, for example polytetrahydrofuran, polyester polyols, polythioether polyols, hydroxyl-containing polyacetals and hydroxyl-containing aliphatic polycarbonates or mixtures of at least two of the polyols mentioned. Preference is given to using polyester polyols and/or polyether polyols. The hydroxyl number of the polyhydroxyl compounds is generally from 28 to 850 mg KOH/g and preferably from 35 to 600 mg KOH/g.

Furthermore, it has been found to be advantageous generally and in particular in the preparation of low-wear polyisocyanate polyaddition products to use prepolymers containing isocyanate groups. Such prepolymers are known in the prior art. Thus, EP-A 0 013 487 describes uretonimine-modified MDI prepolymers. The prepolymers have NCO contents of about 18% by weight. EP-A 0 235 888 describes microcellular elastomers based on polyesterols comprising alkanolamines. As isocyanate component, use is made of prepolymers of MDI and the amine-containing polyester alcohols having an NCO content of about 18% by weight. In EP-A 0 451 559, urethane- and carbodiimide-modified MDI is reacted with polyetherols to produce cellular polyurethane integral foams. EP-A 0 582 385 describes an NCO-terminated prepolymer of MDI and polyetherols having an NCO content of from 17 to 21% by weight which can be reacted to form microcellular elastomers. DE-A 16 18 380 describes NCO-terminated prepolymers which are derived from MDI and branched aliphatic dihydroxy compounds, have molecular weights up to 700 and are liquid at room temperature. The NCO content of these repolymers is from 15 to 25% by weight. WO 91/17197 describes the preparation of microcellular polyurethane elastomers which are used, for example, for shoe soles. As isocyanate component, use is here made of prepolymers of MDI and polytetramethylene glycol which have NCO contents of from 7 to 30% by weight, preferably from 10 to 22% by weight. The storage stability of such prepolymers based on polytetramethylene glycol is, however, unsatisfactory. WO 92/22595 describes prepolymers derived from MDI and a polyol mixture comprising a branched diol or triol and at least one 2- to 4-functional polyoxyalkylene glycol. The NCO contents of the prepolymers are in the range from 15 to 19% by weight.

As disclosed in DE 19618392 A1, prepolymers in which the polyol:polyisocyanate ratio is selected so that the NCO content of the prepolymer is >15% by weight, preferably >13% by weight, have been found to be particularly useful, especially in the case of low-wear polyisocyanate polyaddition products.

Polyol components generally used, in particular for low-wear polyisocyanate polyaddition products and for rigid polyurethane foams, which may, if desired, contain isocyanurate structures, are high-functionality polyols, in particular polyether polyols based on high-functionality alcohols, sugar alcohols and/or saccharides as initiator molecules, and polyol components used for flexible foams are 2- and/or 3-functional polyether polyols and/or polyester polyols based on glycerol and/or trimethylolpropane and/or glycols as initiator molecules or alcohols to be esterified. The preparation of the polyether polyols is carried out by known methods. Suitable alkylene oxides for preparing the polyols are, for example, tetrahydrofuran, 1,3-propylene oxide, 1,2- or 2,3-butylene oxide, styrene oxide and preferably ethylene oxide and 1,2-propylene oxide. The alkylene oxides can be used individually, alternatively in succession or as mixtures. Preference is given to using alkylene oxides which lead to primary hydroxyl groups in the polyol. Polyols which are particularly preferably used are those which have been alkoxylated with ethylene oxide at the conclusion of the alkoxylation and thus have primary hydroxyl groups. The polyether polyols have a functionality of preferably from 2 to 6 and in particular from 2 to 4 and molecular weights of from 400 to 3000, preferably from 400 to 2000.

Suitable polyester polyols can be prepared, for example from organic dicarboxylic acids having from 2 to 12 carbon atoms, preferably aliphatic dicarboxylic acids having from 4 to 6 carbon atoms, and polyhydric alcohols, preferably diols, having from 2 to 12 carbon atoms, preferably from 2 to 6 carbon atoms. The polyester polyols preferably have a functionality of from 2 to 4, in particular from 2 to 3, and a molecular weight of from 480 to 3000, preferably from 600 to 2000 and in particular from 600 to 1500.

As compounds which are reactive toward isocyanates, it is possible to use, if desired, diols and/or triols having molecular weights of from 60 to <400 as chain extenders and/or crosslinkers in the process of the present invention. However, the addition of chain extenders, crosslinkers or, if desired, mixtures thereof can prove to be advantageous for modifying the mechanical properties, e.g. the hardness. The chain extenders and/or crosslinkers preferably have a molecular weight of from 60 to 300. Examples of suitable chain extenders/crosslinkers are aliphatic, cycloaliphatic and/or araliphatic diols having from 2 to 14, preferably from 4 to 10, carbon atoms, e.g. ethylene glycol, 1,3-propanediol, 1,10-decanediol, o-, m-, p-dihydroxycyclohexane, diethylene glycol, dipropylene glycol and preferably 1,4-butanediol, 1,6-hexanediol and bis(2-hydroxyethyl) hydroquinone, triols such as 1,2,4- and/or 1,3,5-trihydroxycyclohexane, glycerol and trimethylolpropane and low molecular weight hydroxyl-containing polyalkylene oxides based on ethylene oxide and/or 1,2-propylene oxide and the abovementioned diols and/or triols as initiator molecules.

If chain extenders, crosslinkers or mixtures thereof are employed for preparing the polyisocyanate polyaddition products, they are advantageously used in an amount of from 0 to 20% by weight, preferably from 2 to 8% by weight, based on the total weight of all the isocyanate-reactive compounds used.

As blowing agents, in particular for producing polyurethane foams, it is possible to use customary chemically active blowing agents, for example water, and/or physically acting blowing agents. Suitable physically acting blowing agents are liquids which are inert toward the organic, modified or unmodified polyisocyanates and have boiling points below 100° C., preferably below 50° C., in particular from −50° C. to 30° C., at atmospheric pressure so that they vaporize under the action of the exothermic polyaddition reaction. Examples of such preferably used liquids are alkanes such as heptane, hexane, n- and iso-pentane, preferably industrial mixtures of n- and iso-pentanes, n- and iso-butane and propane, cycloalkanes such as cyclopentane and/or cyclohexane, ethers such as furan, dimethyl ether and diethyl ether, ketones such as acetone and methyl ethyl ketone, alkyl carboxylates such as methyl formate, dimethyl oxalate and ethyl acetate and halogenated hydrocarbons such as customary fluorinated hydrocarbons and/or chlorinated hydrocarbons, e.g. dichloromethane. Mixtures of these low-boiling liquids with one another and/or with other substituted or unsubstituted hydrocarbons can also be used. Also suitable are organic carboxylic acids such as formic acid, acetic acid, oxalic acid, ricinoleic acid and carboxyl-containing compounds. The blowing agents are usually added to the compounds which are reactive toward isocyanates. However, they can be added to the isocyanate component or, as a combination, both to the polyol component and the isocyanate component or to premixtures of these components with the other formative components. The amount of physically acting blowing agent used is preferably from 0.5 to 25% by weight, particularly preferably from 3 to 15% by weight, in each case based on the weight of all the isocyanate-reactive compounds used. If water is used as blowing agent, preferably in an amount of from 0.5 to 10% by weight, particularly preferably in an amount of from 0.6 to 7% by weight, in each case based on the weight of all the isocyanate-reactive compounds used, it is preferably added to the polyol component.

As catalysts, it is possible to use generally known compounds which strongly accelerate the reaction of isocyanates with the compounds which are reactive toward isocyanates. Preference is given to using a total catalyst content of from 0.001 to 15% by weight, in particular from 0.05 to 6% by weight, based on the weight of all the isocyanate-reactive compounds used. Examples of compounds which can be used are: triethylamine, tributylamine, dimethylbenzylamine, dicyclohexylmethylamine, dimethylcyclo-hexylamine, bis(N,N-dimethylaminoethyl) ether, bis(dimethyl-aminopropyl)urea, N-methylmorpholine and N-ethylmorpholine, N-cyclohexylmorpholine, N,N,N',N'-tetramethylethylene-diamine, N,N,N',N'-tetramethylbutanediamine, N,N,N',N'-tetramethylhexane-1,6-diamine, pentamethyl-diethylenetriamine, dimethylpiperazine, N-dimethylaminoethylpiperidine, 1,2-dimethylimidazole, 1-azabicyclo[2.2.0]octane, 1,4-diazabicyclo[2.2.2]octane (Dabco) and alkanolamine compounds such as triethanolamine, triisopropanolamine, N-methyldiethanolamine and N-ethyldiethanolamine, dimethylaminoethanol, 2-(N,N-di-methylaminoethoxy) ethanol, N,N',N"-tris(dialkylaminoalkyl) hexahydrotriazines, e.g. N,N',N"-tris(dimethylaminopropyl)-s-hexahydrotriazine, iron(II) chloride, zinc chloride, lead octoate and preferably tin salts such as tin dioctoate, tin diethylhexanoate, dibutyltin dilaurate and/or dibutyltin dilauryl mercaptide, 2,3-dimethyl-3,4,5,6-tetrahydropyrimidine, tetraalkylammonium hydroxides such as tetramethylammonium hydroxide, alkali metal hydroxides such as sodium hydroxide, alkali metal alkoxides such as sodium methoxide and potassium isopropoxide, and/or alkali metal salts of long-chain fatty acids having from 10 to 20 carbon atoms and possibly lateral OH groups.

If desired, further auxiliaries and/or additives can be incorporated into the reaction mixture for preparing the polyisocyanate polyaddition products. Examples which may be mentioned are surface-active substances, foam stabilizers, cell regulators, fillers, dyes, pigments, flame retardants, hydrolysis inhibitors, fungistatic and bacteriostatic substances. Suitable surface-active substances are, for example, compounds which serve to aid the homogenization of the starting materials and may also be suitable for regulating the cell structure of the plastics. Examples which may be mentioned are emulsifiers such as the sodium salts of castor oil sulfates or of fatty acids and also amine salts of fatty acids, e.g. diethylamine oleate, diethanolamine stearate, diethanolamine ricinoleate, salts of sulfonic acids, e.g. alkali metal or ammonium salts of dodecylbenzene- or dinaphthylmethanedisulfonic acid and ricinoleic acid; foam stabilizers such as siloxane-oxyalkylene copolymers and other organopolysiloxanes, ethoxylated alkylphenols, ethoxylated fatty alcohols, paraffin oils, castor oil or ricinoleic esters, Turkey red oil and peanut oil, and cell regulators such as paraffins, fatty alcohols and dimethylpolysiloxanes. The abovedescribed oligomeric acrylates having polyoxyalkylene and fluoroalkane radicals as side groups are also suitable for improving the emulsifying action, the cell structure and/or stabilizing the foam. The surface-active substances are usually employed in amounts of from 0.01 to 5% by weight, based on 100% by weight of all the isocyanate-reactive compounds used. For the purposes of the present invention, fillers, in particular reinforcing fillers, are the customary organic and inorganic fillers, reinforcing materials, weighting agents, agents for improving the wear behavior in paints, coatings, etc., known per se. Specific examples are: inorganic fillers such as siliceous minerals, for example sheet silicates such as antigorite, serpentine, hornblendes, amphiboles, chrysotile and talc, metal oxides such as kaolin, aluminum oxides, titanium oxides and iron oxides, metal salts such as chalk, barite and inorganic pigments such as cadmium sulfide and zinc sulfide, and also glass, etc. Preference is given to using kaolin (china clay), aluminum silicate and coprecipitates of barium sulfate and aluminum silicate and also natural and synthetic fibrous minerals such as wollastonite, metal fibers and in particular glass fibers of various lengths which may be coated with a size. Examples of suitable organic fillers are: carbon melamine, rosin, cyclopentadienyl resins and graft polymers and also cellulose fibers, polyamide fibers, polyacrylonitrile fibers, polyurethane fibers, polyester fibers based on aromatic and/or aliphatic dicarboxylic esters and, in particular, carbon fibers. The inorganic and organic fillers can be used individually or as mixtures and are advantageously incorporated into the reaction mixture in amounts of from 0.5 to 50% by weight, preferably from 1 to 40% by weight, based on the weight of the isocyanates and on the weight of all the isocyanate-reactive compounds used, although the content of mats, nonwovens and woven fabrics of natural and synthetic fibers may reach values up to 80% by weight. Suitable flame retardants are, for example, tricresyl phosphate, tris(2-chloroethyl) phosphate, tris(2-chloropropyl) phosphate, tris(1,3-dichloropropyl) phosphate, tris(2,3-dibromopropyl) phosphate, tetrakis(2-chloroethyl) ethylene diphosphate, dimethyl methanephosphonate, diethyl dianolaminophosphonate and also commercial halogen-containing flame retardant polyols. Apart from the abovementioned halogen-substituted phosphates, it is also possible to use inorganic or organic flame retardants such as red phosphorus, hydrated aluminum oxide, antimony trioxide, arsenic oxide, ammonium polyphosphate and calcium sulfate, expandable graphite or cyanuric acid derivatives such as melamine, or mixtures of at least two flame retardants such as ammonium polyphosphates and melamine and also, if desired, maize starch or ammonium polyphosphate, melamine and expandable graphite and/or aromatic or aliphatic polyesters for making the polyisocyanate polyaddition products flame resistant. In general, it has been found to be advantageous to use from 5 to 50% by weight, preferably from 5 to 25% by weight, of the flame retardants mentioned, based on the weight of all the isocyanate-reactive compounds used.

To prepare the polyisocyanate polyaddition products of the present invention, the isocyanates and the compounds which are reactive toward isocyanates are reacted in such amounts that the equivalence ratio of NCO groups of the isocyanates to the sum of the reactive hydrogen atoms of the compounds which are reactive toward isocyanates is 0.85–1.25:1, preferably 0.95–1.15:1 and in particular 1–1.05:1. If, in particular, at least some bound isocyanurate groups are present in the rigid polyurethane foams, it is usual to employ a ratio of NCO groups to the sum of the reactive hydrogen atoms of 1.5–60:1, preferably 1.5–8:1.

To prepare the low-wear polyisocyanate polyaddition products of the present invention, the isocyanates and the compounds which are reactive toward isocyanates are reacted in such amounts that the equivalence ratio of NCO groups of the isocyanates to the sum of the reactive hydrogen atoms of the compounds which are reactive toward isocyanates is 0.85–1.25:1, preferably 0.95–1.15:1 and in particular 1–1.05:1.

As starting materials for the polyurethane elastomers of the present invention, in particular those comprising low-wear polyisocyanate polyaddition products, preference is given to using the customary and known formative components which are also employed in open-cell, flexible polyurethane foams.

Polyisocyanates used are (cyclo)aliphatic and/or, in particular, aromatic polyisocyanates. To produce the flexible polyurethane foams of the present invention, particularly suitable polyisocyanates are diisocyanates, preferably diphenylmethane diisocyanate (MDI) and tolylene diisocyanate (TDI). The isocyanates can be used in the form of the pure compound or in modified form, for example in the form of uretdiones, isocyanurates, allophanates and biurets, preferably in the form of reaction products containing urethane and isocyanate groups, known as isocyanate prepolymers.

As compounds containing at least two hydrogen atoms which are reactive toward isocyanate, use is made, in particular, of polyols having a functionality of from 2 to 4, in particular from 2 to 3, and a molecular weight of from 1000 to 10,000, in particular from 2000 to 6000. Possible polyols are polycarbonate diols, polyesterols and polyetherols, with particular preference being given to polyetherols because of their greater hydrolysis stability. The polyetherols used for producing the flexible polyurethane foams of the present invention are usually prepared by base-catalyzed addition of lower alkylene oxides, in particular ethylene oxide and/or propylene oxide, onto 2- to 4-functional, in particular 2- and 3-functional, initiator substances. Initiator substances used are, in particular, 2- to 4-functional alcohols having molecular weights up to 400, for example ethylene glycol, propylene glycol, glycerol, trimethylolpropane or pentaerythritol. As stated above, preference is given to using polyetherols having an ethylene oxide content, preferably one in the range of 10–80% by weight, based on the weight of the polyetherol, to achieve a further increase in the hydrophilicity of the foams.

The compounds having at least two hydroxyl groups which are reactive toward isocyanate also include chain extenders and/or crosslinkers. The chain extenders are predominantly 2- or three-functional alcohols having molecular weights of less than 400, for example ethylene glycol, propylene glycol, 1,4-butanediol or 1,5-pentanediol. The crosslinkers are compounds having molecular weights of less than 400 and containing 3 or more active H atoms, preferably arnines and particularly preferably alcohols, for example glycerol, trimethylolpropane and/or pentaerythritol.

The elastomers of the present invention can be produced either in the presence or in the absence of chain extenders and/or crosslinkers.

The foamed elastomers of the present invention are produced using blowing agents. The blowing agent used for producing them is nowadays usually water which forms carbon dioxide with reaction with the isocyanate groups, if desired in admixture with physical blowing agents, viz. inert compounds which vaporize under the conditions of polyurethane formation. Examples of physical blowing agents are (cyclo)aliphatic hydrocarbons, preferably those having from 4 to 8, particularly preferably from 4 to 6 and in particular 5, carbon atoms, partially halogenated hydrocarbons or ethers, ketones or acetates. The amount of blowing agents used depends on the intended density of the foams.

The elastomers are usually prepared in the presence of catalysts, for example tertiary amines or organic metal compounds which have been described above, in particular tin compounds such as tin mercaptide.

The reaction is carried out in the presence or absence of auxiliaries and/or additives such as fillers, cell regulators and surface-active compounds.

Further details regarding the starting materials, catalysts and auxiliaries and additives used may be found, for example, in the Kunststoff-Handbuch, volume 7, Polyurethane, Carl-Hanser-Verlag, Munich, 1st edition 1966, 2nd edition 1983 and 3rd edition 1993 and in the above disclosures.

The polyisocyanate polyaddition products are advantageously prepared by the one-shot process, for example by means of the high-pressure or low-pressure technique in open or closed molds, for example metal molds. The continuous application of the reaction mixture to suitable conveyor belts for producing panels or block foams is also customary.

It has been found to be particularly advantageous to employ the two-component process and to combine the compounds which are reactive toward isocyanates, if desired the blowing agent or agents, the catalysts and/or auxiliaries and/or additives in component (A) and to use the isocyanates or mixtures of the isocyanates and, if desired, blowing agents as component (B).

The compounds or particles (i) employed according to the present invention are preferably used in the process of the present invention in admixture with the polyol component, i.e. in admixture with compounds which are reactive toward isocyanates, for example in the above-described component A. However, the compounds (i) can also be mixed into the component (B). This applies also to particles (ii).

The weight ratio of the compounds which are reactive toward isocyanates to particles (i) and/or (ii) is preferably from 5:1 to 20:1.

For the low-wear polyisocyanate polyaddition products, it is preferred that the index, which indicates the mixing ratio of the component A and the component B, is from 90 to 100, preferably from 95 to 99.5 and particularly preferably from 96 to 99. In general, the wear resistance can be increased by increasing the index in addition to the use of wear improvers.

Depending on the application, the starting components are mixed at from 0 to 100° C., preferably from 20 to 60° C., and introduced into the open mold or under atmospheric or superatmospheric pressure into the closed mold or, in the case of a continuous processing station, applied to a belt which accommodates the reaction mixture. Mixing can, as has already been described, be carried out mechanically by means of a stirrer or a stirring screw. The reaction temperature in the mold, i.e. the temperature at which the reaction occurs, is usually >20° C., preferably from 40 to 80° C.

The process of the present invention can be used, as a function of the starting materials, to produce all customary polyisocyanate polyaddition products, but in particular rigid polyurethane foams which may contain isocyanurate structures.

The rigid polyurethane foams produced by the process of the present invention usually have a density of from 15 to 300 kg/m$^3$, preferably from 20 to 240 kg/m$^3$ and in particular from 25 to 100 kg/m$^3$. They are suitable, for example, as insulation in the building and refrigeration appliance sectors, e.g. as intermediate layer in sandwich elements or for filling the housings of refrigerators and freezer chests with foam, and in particular as foams in which materials can be fixed by pressing in; the latter foams preferably have a density of from 20 to 50 kg/m$^3$.

The flexible polyurethane foams produced by the process of the present invention usually have a density of from 15 to 100 kg/m³ and are preferably used in the furniture and automobile sectors, particularly preferably as upholstery material.

The process of the present invention is preferably employed for producing rigid polyurethane foams, which may contain isocyanurate groups, since the advantages of the invention (smooth surface after cutting where the action of heat is involved and also no dust formation on cutting) become particularly apparent in the case of rigid foams.

The foamed elastomers produced by the process of the present invention usually have a density of from 15 to 800 kg/m³, preferably from 20 to 240 kg/m³ and in particular from 25 to 100 kg/m³. The compact elastomers produced by the process of the present invention usually have a density of more than 800 kg/M³, preferably up to a maximum of 1200 kg/M³.

Furthermore, the wear or, in addition, the Shore A or D hardness or the long-term flexural strength can be set in a low-wear polyisocyanate polyaddition product or in a composition comprising this by means of a process according to the present invention by incorporating particles (i) and/or (ii) into the polyisocyanate polyaddition product in an amount of from 0.1 to 10% by weight, based on the polyisocyanate polyaddition product.

In this context, particular preference is given according to the present invention to reducing the wear by increasing the amount of particles (i) and/or (ii) used.

According to the present invention, preference is given to using the low-wear polyisocyanate polyaddition adducts or compact or foamed elastomers or low-wear compositions or at least two thereof for improving the wear behavior in articles, in particular foams, films, fibers, molding compositions and coatings.

Furthermore, it is preferred according to the present invention that articles comprise a low-wear polyisocyanate polyaddition product or a compact or foamed elastomer or a low-wear composition or at least two thereof.

Particularly preferred articles are shoe soles, automobile tires, conveyor belts, industrial seals and rollers subjected to mechanical loads.

The invention is illustrated by the following examples.

EXAMPLE

Example 1

In the individual examples, the A components indicated in Table 1 were intensively mixed by stirring with Lupranat® M 50 (BASF Aktiengesellschaft) as B component at an isocyanate index of 185. Immediately afterwards, 50 g in each case were placed in a tub having a capacity of 1000 ml and reacted. The figures in the table are parts by weight.

TABLE 1

| Example | 1 (co) | 2 (co) | 3 (in) | 4 (in) |
|---|---|---|---|---|
| A component | | | | |
| AF31 wax | — | — | 5 | 10 |
| A wax | — | 10 | — | — |
| Merginat ® PV235 | 52 | 52 | 52 | 52 |
| Castor oil | 25 | 25 | 25 | 25 |
| Lupranol ® 3530 | 18 | 18 | 18 | 18 |
| Tegostab ® B 1903 | 0.5 | 0.5 | 0.5 | 0.5 |
| n-Pentane | 11.6 | 11.6 | 11.6 | 11.6 |
| Water | 3.5 | 3.5 | 3.5 | 3.5 |
| Lupragen ® N 206 | 0.13 | 0.3 | 0.13 | 0.13 |

TABLE 1-continued

| | | | | |
|---|---|---|---|---|
| 20% strength potassium formate solution in ethylene glycol | 3.7 | 3.7 | 3.7 | 3.7 |
| Lupragen ® N 600 | 0.55 | 0.55 | 0.55 | 0.55 |

| | |
|---|---|
| (co): | comparative example, |
| (in): | example according to the present invention, |
| Merginat ® PV235: | polyol, hydroxyl number = 270 mg KOH/g, functionality = 6 (Harburger Fettchemie) |
| Lupranol ® 3530: | polyether polyol based on glycerol/propylene oxide, hydroxyl number = 500 (BASF Aktiengesellschaft), |
| Tegostab ® B 1903: | stabilizer (Goldschmidt), |
| Lupragen ® N 206: | amine catalyst (BASF Aktiengesellschaft), |
| Lupragen ® N 600: | amine catalyst (BASF Aktiengesellschaft), |
| AF31 wax: | very finely micronized polyethylene wax, 99.9% smaller than 32 µm, 70% smaller than 10 µm, (BASF Aktiengesellschaft), |
| A wax: | polyethylene wax, particle size >1000 µm, |
| Lupranat ® M 50: | polymeric MDI, NCO content = 31%. |

The A component of Example 2 was not stable, so that no foam could be produced. The reaction parameters for Examples 1, 3 and 4 are shown in Table 2.

TABLE 2

| Example | 1 (co) | 3 (in) | 4 (in) |
|---|---|---|---|
| Cream time [s] | 36 | 37 | 35 |
| Fiber time [s] | 118 | 120 | 118 |
| Rise time [s] | 180 | 165 | 175 |

To assess the processability of the rigid foams, they were cut by means of a hot wire cutting apparatus (from Dingeldein). The rigid foams produced according to the present invention using the micronized waxes did not form any dust on cutting with the hot wire. The cut surface was pleasantly smooth. In contrast, the rigid foam of Example 1 which had been produced without micronized wax produced dust during cutting with the hot wire and, in addition, had an unpleasantly rough, visually unsatisfactory surface after cutting.

Example 2

The various wear improvers were added to the component A.

Component A
  30 parts by weight of a trifunctional polyetherol based on propylene oxide, having an ethylene oxide end block of 21%, an OH number of 26 mg KOH/g and a mean functionality of 3,
  57.3 parts by weight of a bifunctional polyetherol based on propylene oxide, having an ethylene oxide end block of 19%, an OH number of 28 mg KOH/g and a mean functionality of 2,
  7.5 parts by weight of 1,4-butanediol,
  4.5 parts by weight of a 25% strength solution of Dabco in 1,4-butanediol,
  0.2 part by weight of a tin mercaptide,
  0.47 part by weight of water.

Component B
  Prepolymer of 4,4'-MDI (76%), a polymeric MDI (4%) and a bifunctional polyol having an OHN of 104 and based on propylene oxide (16.5%) and dipropylene glycol (6.0%), having an NCO content of 20.5%.

Using a model F 20 low-pressure processing machine from Elastogran-Maschinenbau GmbH, the components were combined at 25° C. and processed to produce test plates having dimensions of 20 cm×20 cm×1 cm. Details are given in Table 3 below.

TABLE 3

Comparison of various wear improvers
The component A contains 0.5% of emulsifier.

| Expt. No. | A:B = 100 | Wear imp. in A | DIN wear, mg | Special wear, μm | Long-term flexure | Shore A hardness |
|---|---|---|---|---|---|---|
| 1 | 104 | 2% AF31 | 246 | 515 | 7.0; 4.5; 6.5; 5.5 | 45 |
| 2 | 106 | 2% AF31 | 143 | 245 | 6.5; 7.5; 6.0; 8.5 | 45 |
| 3 | 108 | 2% AF31 | 134 | 180 | rupture | 45 |
| 4 | 110 | 2% AF31 | 104 | 145 | rupture | 45 |
| 5 | 112 | 2% AF31 | 94 | 120 | rupture | 44 |
| 6 | 102 | 2% AF29 | 128 | 410 | 4.2; 5.3; 6.0; 5.8 | 45 |
| 7 | 104 | 2% AF29 | 98 | 245 | 4.0; 4.5; 5.2; 4.6 | 45 |
| 8 | 106 | 2% AF29 | 84 | 135 | 5.2; 4.5; 4.4; 5.2 | 46 |
| 9 | 108 | 2% AF29 | 70 | 165 | 9.5; 6.8; 7.8; 7.9 | 47 |
| 10 | 110 | 2% AF29 | 59 | 135 | rupture | 46 |
| 11 | 112 | 2% AF29 | 50 | 110 | rupture | 44 |
| 12 | 102 | 2% AF32 | 151 | 290 | 7.0; 7.1; 8.5; 7.5 | 43 |
| 13 | 104 | 2% AF32 | 117 | 245 | 4.2; 4.3; 3.5; 3.5 | 45 |
| 14 | 106 | 2% AF32 | 79 | 200 | 5.0; 3.6; 4.5; 6.0 | 47 |
| 15 | 108 | 2% AF32 | 69 | 170 | 5.6; 5.8; 4.2; 7.5 | 47 |
| 16 | 110 | 2% AF32 | 60 | 125 | rupture | 47 |
| 17 | 112 | 2% AF32 | 55 | 140 | rupture | 45 |
| 18 (comp.) | 102 | 1% Q2 | 40 m 100%* | 205 | 4.5; 4.5; 5.5; 4.5 | 43 |
| 19 (comp) | 104 | 1% Q2 | 234 | 185 | 6.5; 7.0; 8.2; 4.5 | 45 |
| 20 (comp.) | 106 | 1% Q2 | 124 | 155 | 8.5; 5.0; 6.5; 4.2 | 46 |
| 21 (comp.) | 108 | 1% Q2 | 102 | 100 | rupture | 46 |
| 22 (comp.) | 110 | 1% Q2 | 89 | 120 | rupture | 45 |
| 23 (comp.) | 112 | 1% Q2 | 98 | 125 | rupture | 46 |
| 24 (comp.) | 102 | none | | | 5.5; 5.9; 5.6; 6.8 | 43 |
| 25 (comp.) | 104 | none | | | 14.6; 4.5; 11.7; 8.1 | 42 |
| 26 (comp.) | 106 | none | 100% wear | 580 | rupture | 43 |
| 27 (comp.) | 108 | none | 100% wear | 475 | rupture | 44 |
| 28 (comp.) | 110 | none | 100% wear | 505 | rupture | 44 |

100% wear after a wear distance of 40 m

"Index" is the ratio of component A to component B used in foaming.

"Wear imp. in A" is the proportion of wear improver in component A.

"AF-29, AF-31, AF-32" (BASF products named Luwax AF (-29, -31, -32).

"Q2" is silicone rubber from Dow Corning, essentially copolymers of methoxysiloxane and polyoxyalkyl in glycol, as disperse silicone additive in component A.

"DIN wear, mg" is the abrasion loss in mg determined in accordance with DIN 53516.

"Special wear, μg" is the abrasion loss determined by a method in EUEN 344.

"Long-term flexure" determined in accordance with DIN 53505.

"Shore A hardness" was determined in accordance with DIN 53505.

"Dabco in 1,4-butanol" obtained from Air Products.

We claim:

1. A process for preparing polyisocyanate polyaddition foam products comprising reacting isocyanates with isocyanate-reactive compounds having hydroxyl numbers of from 28 to 850 mg KOH/g, wherein the polyaddition reaction is carried out in the presence of a blowing agent and particles having a size of <200 μm wherein the particles are either (i) thermoplastic particles having a melting point in the range of 50° to 300° C., or (ii) thermoset particles or a mixture of thermoplastic particles (i) and thermoset particles (ii).

2. The process as claimed in claim 1, wherein the thermoplastic particles (i) comprise polyolefins and/or waxes.

3. The process as claimed in claim 1, wherein the thermoplastic particles (i) have a size of ≦100 μm.

4. The process as claimed in 1, further comprising providing a weight ratio of the isocyanate-reactive compounds to the thermoplastic particles (i) and/or thermoset particles (ii) of from 5:1 to 300:1.

5. The process as claimed in claim 1, wherein the thermoplastic particles (i) and/or thermoset particles (ii) are mixed with the isocyanate-reactive compounds prior to reaction with the polyisocyanates.

6. A polyisocyanate polyaddition foam product comprising the reaction product of isocyanates with isocyanate-reactive compounds having a hydroxyl number of from 28 to 850 mg KOH/g, in the presence of blowing agents and particles having a size of <200 μm, said particles comprising (i) thermoplastic particles having a melting point in the range from 50° to 300° C., or (ii) thermoset particles, or a mixture of said thermoplastic particles (i) and said thermoset particles (ii).

7. The polyisocyanate polyaddition foam product as claimed in claim 6, wherein the thermoplastic particles (i) comprise polyolefins and/or waxes.

8. The polyisocyanate polyaddition foam product as claimed in claim 6, wherein the particles have a size of ≦100 μm.

9. The polyaddition foam product as claimed in claim 6, comprising a weight ratio of said isocyanate-reactive compounds to said particles of from 5:1 to 300:1.

* * * * *